US010051410B2

(12) United States Patent
Booth et al.

(10) Patent No.: US 10,051,410 B2
(45) Date of Patent: Aug. 14, 2018

(54) ASSIST DEVICE AND SYSTEM

(71) Applicant: UNALIWEAR, INC., Austin, TX (US)

(72) Inventors: Jean Anne Booth, Austin, TX (US); Jonathan Guy, Austin, TX (US); Brian Kircher, Georgetown, TX (US)

(73) Assignee: UnaliWear, Inc., Austin, TX (US)

(*) Notice: Subject to any disclaimer, the term of this patent is extended or adjusted under 35 U.S.C. 154(b) by 0 days.

(21) Appl. No.: 14/917,787

(22) PCT Filed: Sep. 19, 2014

(86) PCT No.: PCT/US2014/056687
§ 371 (c)(1),
(2) Date: Mar. 9, 2016

(87) PCT Pub. No.: WO2015/042487
PCT Pub. Date: Mar. 26, 2015

(65) Prior Publication Data
US 2016/0227361 A1  Aug. 4, 2016

Related U.S. Application Data

(60) Provisional application No. 61/879,806, filed on Sep. 19, 2013.

(51) Int. Cl.
G08B 21/02 (2006.01)
H04W 4/02 (2018.01)
(Continued)

(52) U.S. Cl.
CPC .......... H04W 4/02 (2013.01); G08B 21/0446 (2013.01); G08B 21/0453 (2013.01); H04W 4/22 (2013.01)

(58) Field of Classification Search
CPC ............... G08B 21/02; G08B 21/0269; G08B 21/0272; G08B 21/0275; G08B 21/0277;
(Continued)

(56) References Cited

U.S. PATENT DOCUMENTS 2,764,640 A * 9/1956 Osserman ............ H04R 25/402
381/322
7,545,318 B2 * 6/2009 Derrick .................. G01S 19/34
342/357.74
(Continued)

FOREIGN PATENT DOCUMENTS

CN          087188 A    1/1996
CN       101520815 A    9/2009
(Continued)

OTHER PUBLICATIONS

"Chinese Application Serial No. 201480051752.9, Office Action dated Apr. 26, 2017", w/English Translation, 9 pgs.
(Continued)

Primary Examiner — Van Trieu
(74) Attorney, Agent, or Firm — Schwegman Lundberg & Woessner, P.A.

(57) ABSTRACT

A wearable device is adapted to monitor a wearer's physical activity patterns and to provide assistance to the wearer when a need for assistance is indicated. The device includes a processor is programmed to cause the device to collect activity data necessary to determine the physical activity pattern of the wearer over time, to provide the gathered activity data to a server via a network interface for processing to create or update behavioral rules for the wearer, to receive the behavioral rules from the server for comparison to the received activity data, and to provide to the wearer via the user interface assistance information when the wearer has requested assistance or when a check of the wearer's activity against the behavioral rules indicates that the wearer may need assistance. The behavioral rules are created and updated using historical wearer data including location mapping of the wearer over time, identification of a home area, location boundaries, sleep/wake cycles of the wearer, (Continued)

location time comparisons over different time periods, and physiological sensor measurements.

20 Claims, 13 Drawing Sheets

(51) Int. Cl.
*G08B 21/04* (2006.01)
*H04W 4/22* (2009.01)

(58) Field of Classification Search
CPC ............ G08B 21/0438; G08B 21/0446; G08B 21/0453; H04W 4/02; H04W 4/021; H04W 4/023; H04W 4/025; H04W 4/028; H04W 4/04; H04L 43/00; H04L 43/04; H04L 43/06; H04L 43/10
See application file for complete search history.

(56) References Cited

U.S. PATENT DOCUMENTS

| | | | | |
|---|---|---|---|---|
| 8,577,392 | B1* | 11/2013 | Pai | H04L 67/18 455/404.2 |
| 8,989,053 | B1* | 3/2015 | Skaaksrud | H04W 12/06 370/255 |
| 2001/0004234 | A1 | 6/2001 | Petelenz et al. | |
| 2004/0004234 | A1* | 1/2004 | Yagishita | H01L 21/76801 257/213 |
| 2005/0010087 | A1 | 1/2005 | Banet et al. | |
| 2007/0197878 | A1 | 8/2007 | Shklarski | |
| 2007/0279002 | A1* | 12/2007 | Partovi | H02J 7/0027 320/115 |
| 2008/0146892 | A1 | 6/2008 | LeBoeuf et al. | |
| 2015/0073907 | A1* | 3/2015 | Purves | G06Q 20/32 705/14.58 |

FOREIGN PATENT DOCUMENTS

| | | |
|---|---|---|
| CN | 102184312 A | 9/2011 |
| CN | 102289911 A | 12/2011 |
| CN | 102982652 A | 3/2013 |
| CN | 202838608 U | 3/2013 |
| CN | 203015121 U | 6/2013 |
| JP | 2006170751 A | 6/2006 |
| JP | 2007265017 A | 10/2007 |

OTHER PUBLICATIONS

"Chinese Application Serial No. 201480051752.9, Office Action dated Dec. 22, 2017", w/ English Translation, 22 pgs.
"Chinese Application Serial No. 201480051752.9, Response filed Aug. 30, 2017 to Office Action dated Apr. 26, 2017", w/English Translation, 17 pgs.
"European Application Serial No. 14845754.2, Response filed Sep. 6, 2017 to Supplementary European Search Report dated Feb. 7, 2017", 12 pgs.
"European Application Serial No. 14845754.2, Supplementary European Search Report dated Feb. 7, 2017", 7 pgs.
"International Application Serial No. PCT/US2014/056687, International Preliminary Report on Patentability dated Mar. 31, 2016", 7 pgs.
"International Application Serial No. PCT/US2014/056687, International Search Report dated Dec. 22, 2014", 2 pgs.
"International Application Serial No. PCT/US2014/056687, Written Opinion dated Dec. 22, 2014", 5 pgs.
"Japanese Application Serial No. 2016-544038, Office Action dated Jan. 30, 2018", w/English Translation, 6 pgs.
"Chinese Application Serial No. 201480051752.9, Response filed Mar. 5, 2018 to Office Action dated Dec. 22, 2017", w/ English Translation, 8 pgs.
"Australian Application Serial No. 2014321303, First Examination Report dated Apr. 23, 2018", 3 pgs.
"Japanese Application Serial No. 2016-544038, Response filed Apr. 18, 2018 to Office Action dated Jan. 30, 2018", With English Translation, 13 pgs.

* cited by examiner

| Power State | Description | Radio | Sensor Updates | Sensor Triggers | Display | Data Processing | Caregiver Alert | Audio | LED color |
|---|---|---|---|---|---|---|---|---|---|
| Deep Sleep | Lowest Power state. Entered when user has been stationary for 30 mins and there have been no exception or assist events in last 24 hours | Off | Every 5 minutes | Enabled | Shows time of day | Periodic Little | None | None | None |
| Sleep | Entered when user has been stationary for 5 mins - or longer if an exception or assist event has occurred in last 24 hours | Off | Every minute | Enabled | Shows time of day | Periodic Little | None | None | None |
| Low Active | User is moderately active and/or Little data indicates low risk | Off | Every 10 seconds | Enabled | Shows time of day | Little | None | None | Green |
| High Active | User is active and/or Little data indicates some risk | Off | Every 5 seconds | Enabled | Shows time of day | Little | None | None | Green |
| Low Assist | An assist event has been detected. Device has initiated communication with user. | Off | Every 1 second | n/a | Prompts to user | Little | None | Yes | Yellow |
| High Assist | Entered when: User requests, Little data event occurs, user slow to respond, extreme sensor trigger. Device connects to radio to provide detailed analysis and assistance to user | On | Every 1 second | n/a | Prompts to user | Big | Optional | Yes | Red |
| Exception | Entered if user requests or assist event is unresolved. | On | Every 1 second | n/a | Prompts to user | Big | Yes | Yes | Flash Red |

FIG. 13

ASSIST DEVICE AND SYSTEM

CROSS-REFERENCE TO RELATED APPLICATIONS

This application is the National Stage of International Patent Application No. PCT/US2014/056687, filed Sep. 19, 2014, which claims the benefit of U.S. Provisional Patent Application No. 61/879,806, filed Sep. 19, 2013, the disclosures of which are incorporated herein by reference in their entireties.

BACKGROUND

Ill, elderly, or infirm persons typically desire to remain at home and continue to live as independently as possible. However, it is not practical for some people to live a completely independent life and various types of assistance or supportive care is needed. Healthcare professionals, or family and friends typically provide assistive or supportive care. In order for others to provide the needed assistance and support they must to be notified when help is needed. Thus, there is a need to monitor and communicate with a person that desires to live as independently as possible, as well as provide monitoring and communication capabilities to those directly or indirectly involved in providing assistance or care to the person.

Monitoring and evaluating physical activity patterns, detecting the occurrence of falls, and recognizing deviations from normal life patterns that indicate the need for assistance are not readily available due to the lack of devices and systems that allow monitoring of a person in an accurate, convenient, unobtrusive, and socially acceptable manner. There is a need for development of assistive technologies that monitor and communicate in an unobtrusive, dignified manner.

SUMMARY

Embodiments are directed to devices, systems, and methods for monitoring and assisting a subject in various life tasks. Certain embodiments are directed to a wearable life assist device. In certain aspects the device is capable of one or more tasks that include, but are not limited to monitoring the user (e.g., learning patterns and detecting deviations from learned patterns), providing an easy to use user interface, and communicating with external devices and systems.

In certain aspects the device can signal or query the user by vibration, visual, and/or audible queries. The user can accept, decline, or ignore the device query. In certain scenarios the device query can increase in frequency and/or intensity (e.g., when information gathered by the device indicates an emergency situation). In certain aspects the device query can be coordinated with reports or alerts to one or more third parties. In certain aspects the device can comprise one or more user interfaces that use touch or verbal input mechanisms.

In certain aspects, a device comprises a controller and a memory coupled to the controller, the memory having program instructions stored thereon that, upon execution by the controller, cause the device to gather, via one or more sensors coupled to the controller, data related to a status or activity of a user, and to monitor the status or activity of a user; and provide the data to a server via a network, wherein the data is configured to enable the server to learn activity patterns and to monitor the user's health and activity.

A device can be in communication with a server via a network. The server may receive and analyze data from the device, as well as formulate rules, analyze data, and transmit data and/or rules to the device and/or third parties. In analyzing data the server may read current rules or generate an initial set of rules. As the server receives data transmitted by the device or other sources, the server may use various engines to modify the existing rules. The server may create a map based on location data, identify sleep/wake cycles, identify correlations between time and location, identify activity patterns, identify normal ranges of physiologic parameters and the like. In creating one or more maps based on location data the server may create a heat map indicating the frequency in which certain locations are occupied or visited, identify a home area, define boundaries, and the like. Once the server has processed the data the server may communicate any modifications or changes to be implemented by the device.

In a further aspect, a server comprises a controller and a memory coupled to the controller, the memory having program instructions stored thereon that, upon execution by the controller, cause the server to gather, via one or more sensors coupled to the controller, data related to a status or activity of a user; to analyze data received from a portable device and/or stored locally on the server; to generate new rules or modify established rules; to monitor the status or activity of a user; and/or provide data to a portable device via a network, wherein the data is configured to enable the server to learn activity patterns and to monitor the user's health and activity based on data received from the portable device. In certain aspects the server will be configured to communicate with family, friends, and/or service providers based on parameters and rules programmed in the server or learned by the server.

Certain embodiments are directed to a wearable device, which comprises a controller, a memory, one or more sensors, and a network interface coupled to a power source; (a) the memory and the sensors are coupled to the controller with the memory having program instructions stored thereon that, upon execution by the controller, cause the device to gather, via the one or more sensors coupled to the controller, data necessary to determine the status, location, or activity of the wearer; wherein the controller, based upon the status, location, or activity of a wearer, is configured to provide the sensor data to a server via a network interface, wherein the data may be configured or processed by the controller to enable the server to detect activity patterns and to take actions that improve the wearer's health and safety; and (b) the network interface is configured to provide a network connection to the server that allows the wearable device to receive instructions from the server in order to take actions such as audio and data communications, gather additional sensor data, or change the program instructions stored in the memory. In certain aspects the wearable device is configured to be worn on the wrist of a wearer. In a further aspect the network interface is a wireless interface. In certain aspects the wearable device further comprises a sensor, which can be, but is not limited to a gyroscope sensor configured to detect a falling incident and a global positioning sensor to determine location of the wearer. The wearable device can further comprise a continuous speech recognition interface configured to enable speech interaction with the device. In certain aspects the speech recognition interface is configured to receive or transmit a request for assistance and to receive instructions and queries from the server to provide assistance to the wearer. The power source can comprise a battery system having at least one removable battery. The wearable device can comprise two or more removable batteries, the removable batteries are configured to be removed independently such that a battery can be removed using one hand without disrupting the function of the wearable device. In certain aspects there is a permanent battery that maintains function as the removable batteries are replaced.

Certain embodiments are directed to methods of monitoring a subject comprising receiving and processing data in the memory or controller of a wearable device from sensors of the wearable device, wherein the wearable device is programmed to monitor the location and orientation of a wearer of the wearable device. In certain aspects the wearable device queries the wearer if an aberrant location or orientation is detected. In a further aspect the query or queries to the wearer is provided in escalating stages. In certain aspects the initial stage is a low level stage such as vibration of the wearable device or an audible ping or short sound. In certain aspects an escalated stage or most escalated stage is providing an audible alarm in conjunction with contacting emergency medical services.

Certain embodiments are directed to an assist system, which: comprises a wearable device, and a server or cooperative group of servers; (a) the wearable device comprising a controller, a memory, one or more sensors, and a network interface coupled to a power source, wherein (i) the memory and the sensors are coupled to the controller with the memory having program instructions stored thereon that, upon execution by the controller, cause the device to gather, via the one or more sensors coupled to the controller, data necessary to determine the status, location, or activity of the wearer; wherein the controller, based upon the status, location, or activity of a wearer, is configured to provide the sensor data to a server via a network interface, wherein the data may be configured or processed by the controller to enable the server to detect activity patterns and to take actions that improve the wearer's health and safety; and (ii) the network interface is configured to provide a network connection to the server that allows the wearable device to receive instructions from the server in order to take actions such as audio and data communications, gather additional sensor data, or change the program instructions stored in the memory. (b) the server or cooperative group of servers includes a controller and a memory coupled to the controller, the memory having program instructions stored thereon that, upon execution by the controller, cause the server to gather data from a wearable device related to a status or activity of a wearer, and to monitor and process the data from the device; the server or cooperative group of servers are configured to (i) provide data to the wearable device via a network, wherein the data is configured to enable the server to recognize and anticipate activity patterns, (ii) take actions that improve the wearer's health and safety, and (iii) monitor and communicate with the wearable device to protect the wearer. In certain aspects the server is configured to process data from a plurality of wearable devices and is configured in part to send individual instruction to individual wearable devices. The server can also be configured to communicate with third parties regarding the health and safety of a subject wearing the wearable device. In certain aspects the third party is a care-taker, law enforcement, or emergency medical services.

Certain embodiments are directed to methods of controlling and communicating with a wearable device, comprising (a) receiving the data transmitted by a wearable device of claim 1 at a server; (b) analyzing data received from the wearable device on the server; (c) analyzing data related to the wearable device or wearer stored locally on the server; (d) formulating one or more rules or instructions to be transmitted to the wearable device; and (e) transmitting the one or more rules or instructions to the wearable device.

Other embodiments are directed to a system of multiple rechargeable battery pods configured such that a user can replace a battery pod using one hand while continuously wearing the device.

Still other embodiments are directed to a battery power transfer system for wearer-removable batteries, employing split transformers in a configuration that allows power transfer at very high efficiency over a range of power load conditions.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIG. 13 illustrates a potential embodiment of various power states used for power conservation.

DESCRIPTION

Subjects living independently or semi-independently, up to the time that the subjects require full-time care, can use the device, systems, and/or methods described herein for daily assistance in a private, non-obtrusive manner (e.g., subtle query by using vibration or private communication). In certain embodiments even those subjects requiring full time care can benefit from aspects described herein. In certain embodiments the behavioral theme is "unobtrusive assistance with dignity". The technologies implemented in aspects of the invention are chosen to allow the user privacy while assisting in completion of everyday tasks and in maintenance of their safety. Other more intrusive modes may be available to the user if the user so chooses or if circumstances require.

I. Life Assist System

Figure 1:
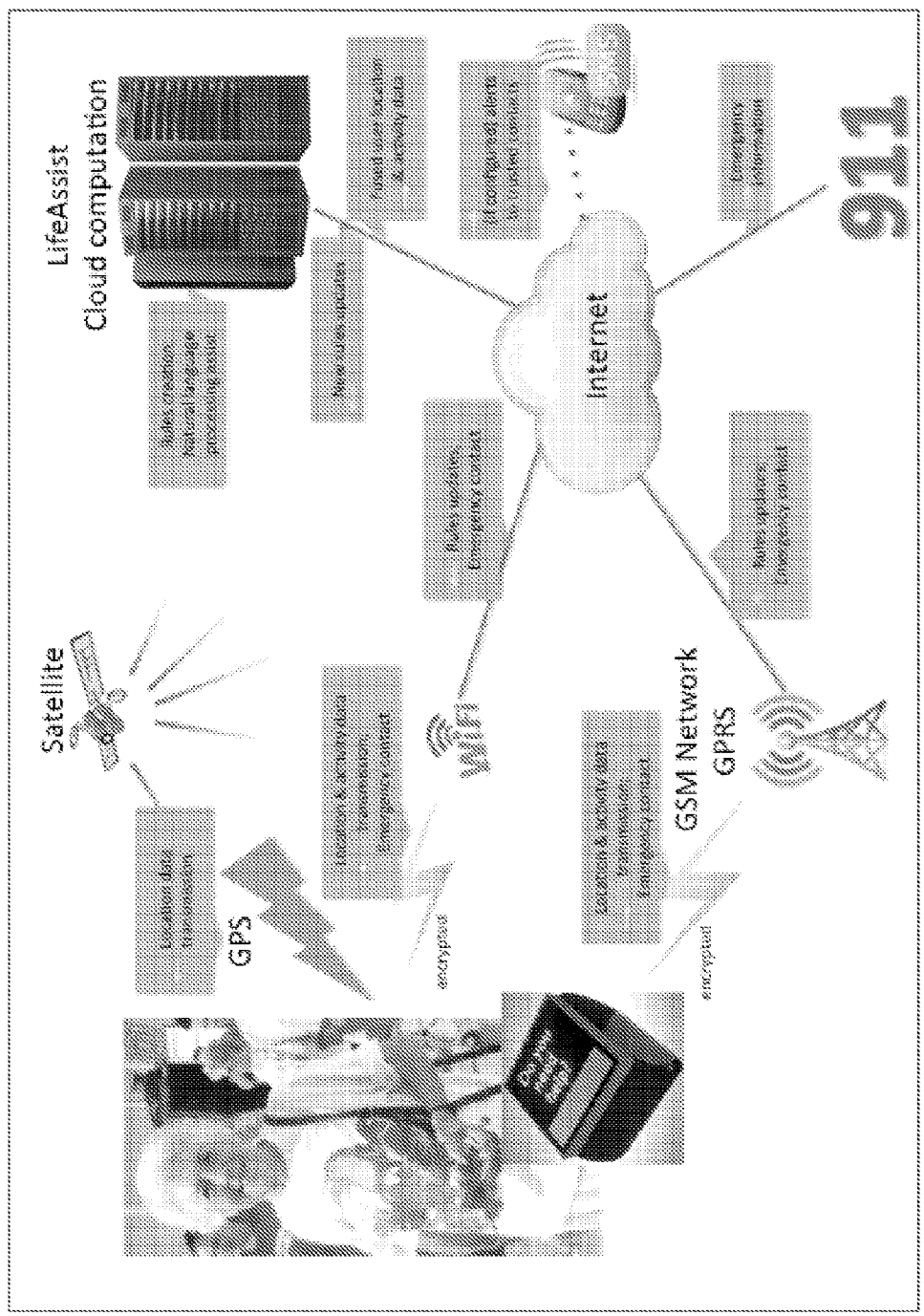
FIG. 1 illustrates a general overview of one embodiment of a life assist system.

Embodiments are directed to a system that assists a subject in aspects of everyday life. FIG. 1 illustrates an embodiment of the system described herein. The system comprises a monitor/communication device ("device") worn by a user. The device can comprise a battery system that allows for charging of the device without removing the device from the user. The device comprises communication components that access internet or other cloud based systems or devices using one or more communication protocols or computer networks, e.g., LTE, HSPA, Bluetooth, local area networks (LAN), wireless local area networks (WLAN, e.g., Wi-Fi networks), global systems for mobile communications (GSM) networks, general packet radio service (GPRS) networks, internet, intranets, and the like. Internet or cloud based devices can include servers, computation centers, mobile devices, satellites, telephones, short message service (SMS) systems, and other systems connected to the device by computer networks.

In certain embodiments an assistance server is operatively connected to the device via a network. The server can provide various programs and analysis to support the functionality of the device. In a further aspect the assistance server can provide communication routines or programs to control communications between the device and third party devices, such as trusted party devices, navigation services, emergency services, and the like. In a further aspect the life assist server can provide routines or programs for learning life patterns of the user as well as detecting deviations from those patterns and detecting emergency situations.

Figure 2:
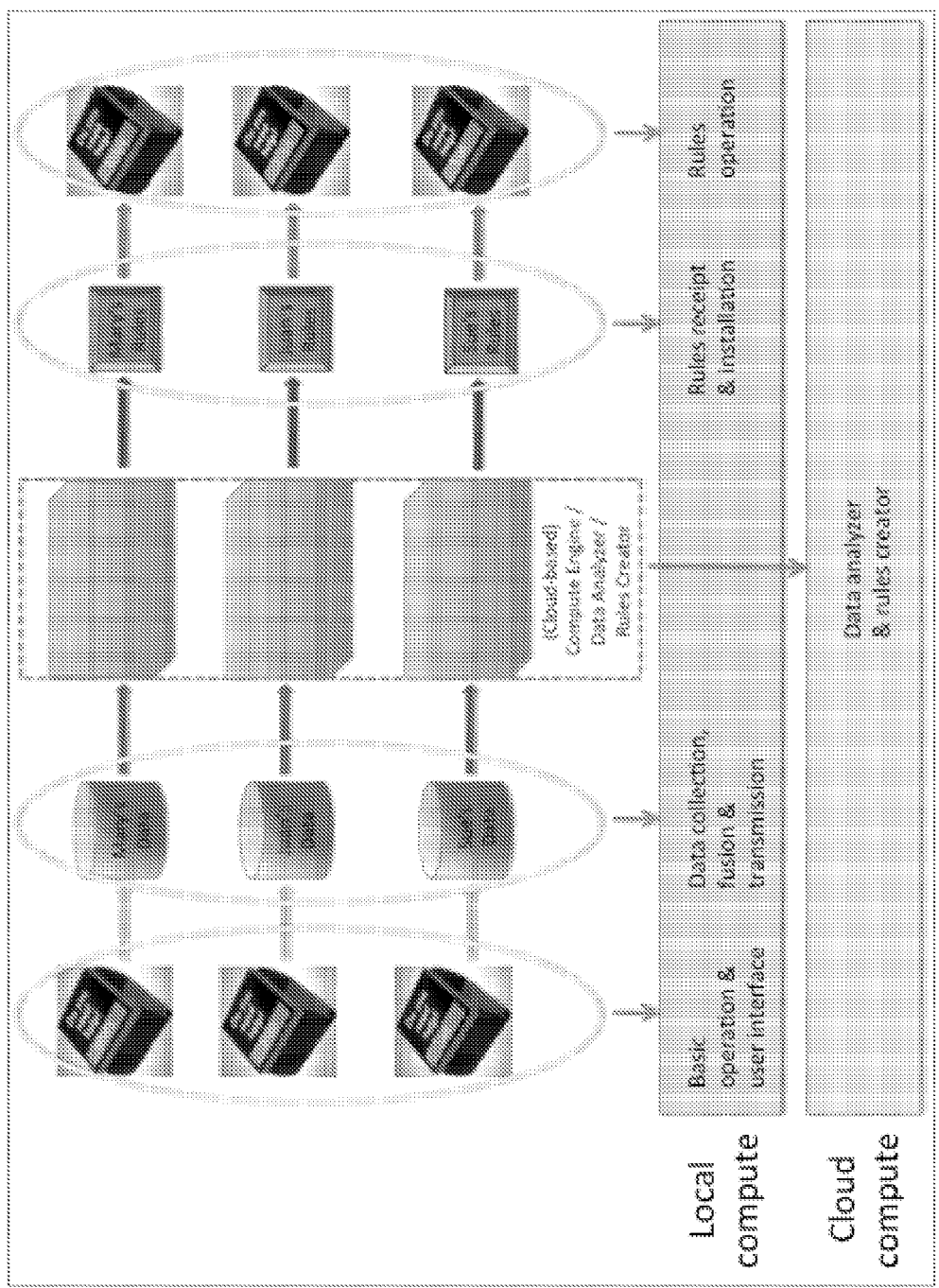
FIG. 2 illustrates a schematic of one embodiment showing some of the functionality and interaction between life assist system components.

The device will conduct certain system functions locally, while the assistance server or other systems accessible through a computer network conducts other functions. The assistance server or other system(s) can provide supporting services or data to the device, such as data defining life patterns, back up functions, and the like. FIG. 2 provides a general illustration of an example of workflow in such a system. The device provides for basic operation and user interface as well as data collection, fusion, and transmission. As used herein, fusion is the use of algorithms to combine sensor data such that the fused representation of the data is superior to the individual components. With respect to the device, system, and methods described herein data is fused from sensors including accelerometers (one or more), magnetometer, altimeter, and a gyroscope to get a unified representation of motion in a 3D space. The device transmits collected data to a cloud-based computer that analyzes the data and creates rules and other programming for implementation and monitoring by the device. The cloud-based system transmits rules and provides for the installation of or adjustment to the appropriate programming on the device. The device implements the operation of the rules and the monitoring of the user.

Figure 3:
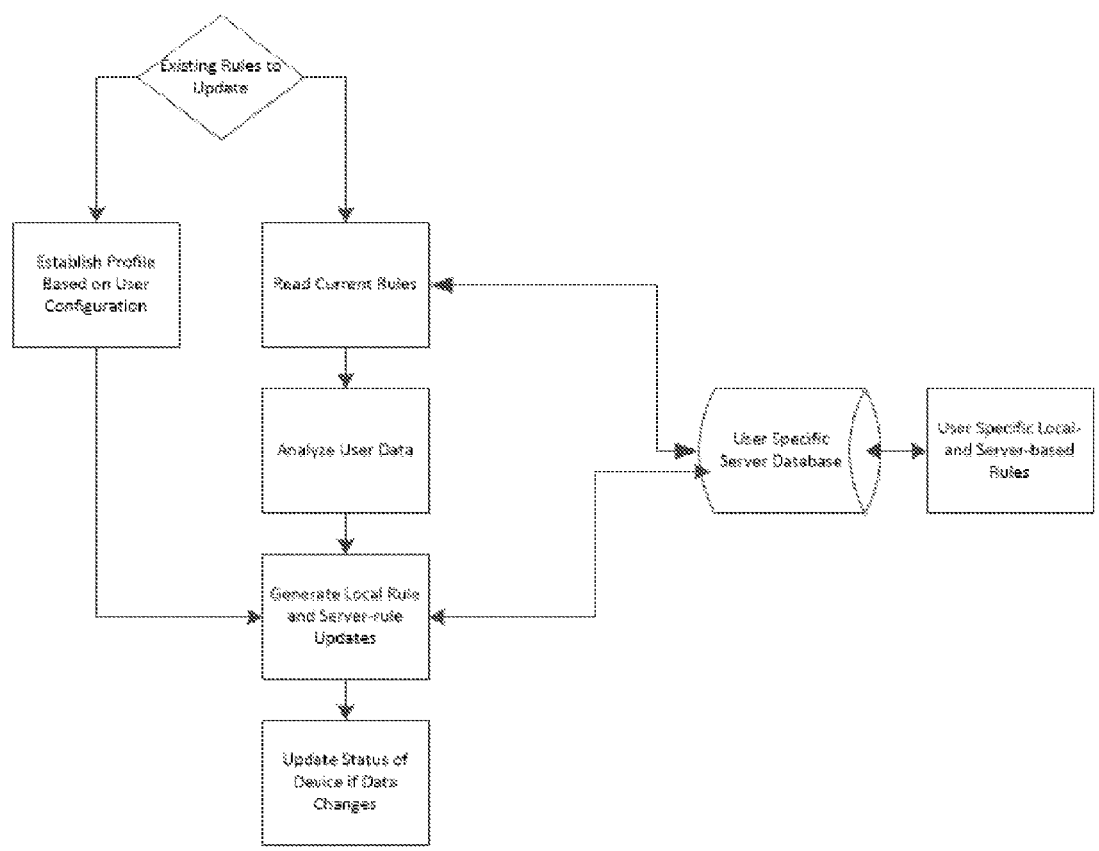
FIG. 3 is a flow diagram for the generation and updating of rules related to the system described herein.

FIG. 3 is a flow diagram depicting the general process of establishing or updating rules, instructions, or procedures that are implemented on a device. The initial query in FIG. 3 is the status of a rule update. If no rules are available for updating then the procedures for establishing a profile for the user and generating user specific rules are followed. If rules updates are available for existing rules then the current rules are read and analyzed based on historical user data. User data can include, but is not limited to location mapping over time (e.g., a heat map of location data); identification of a home area; typical location boundaries; sleep/wake cycles; hourly, daily, or weekly location time comparisons, activity patterns, and physiologic measures (e.g., body temperature, blood pressure, pulse, to name a few). The analysis of current rules or the establishment of a new user is typically followed by generating local or cloud rules updates. User specific information is stored in a user specific database that is accessed as needed for updating and providing information to the server. If the local content or parameters have changed the server will identify the user as having a local user update available and will communicate such through the system as appropriate.

Figure 4:
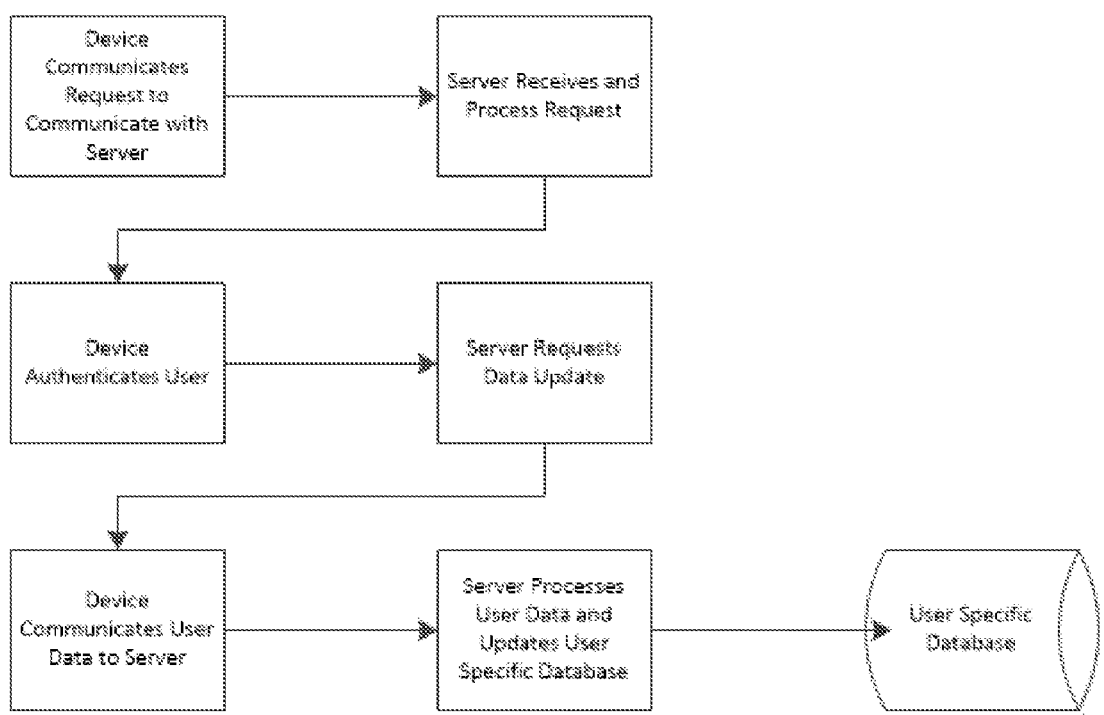
FIG. 4 is a flow diagram depicting the general process of updating a server associated with a system described in the application.

FIG. 4 diagrams a general process for the device to update the information or programming of the server. If the device has new information or is programmed to periodically update the information supplied to the server it will communicate a request for communication to the server. The server will receive and process the request, which may include establishing encryption protocols, identifying the user from which the request originated, etc. Once the request from the device is processed the server will query the device in order to authenticate the user. The device will provide the appropriate information for authentication. The server will request an update to the user data. The device will respond by communicating data currently on the device to the server.

The server will store this information in specific user database. If the server determines that user specific updates are needed, the server will initiate communication with the device to implement a device update.

Figure 5:
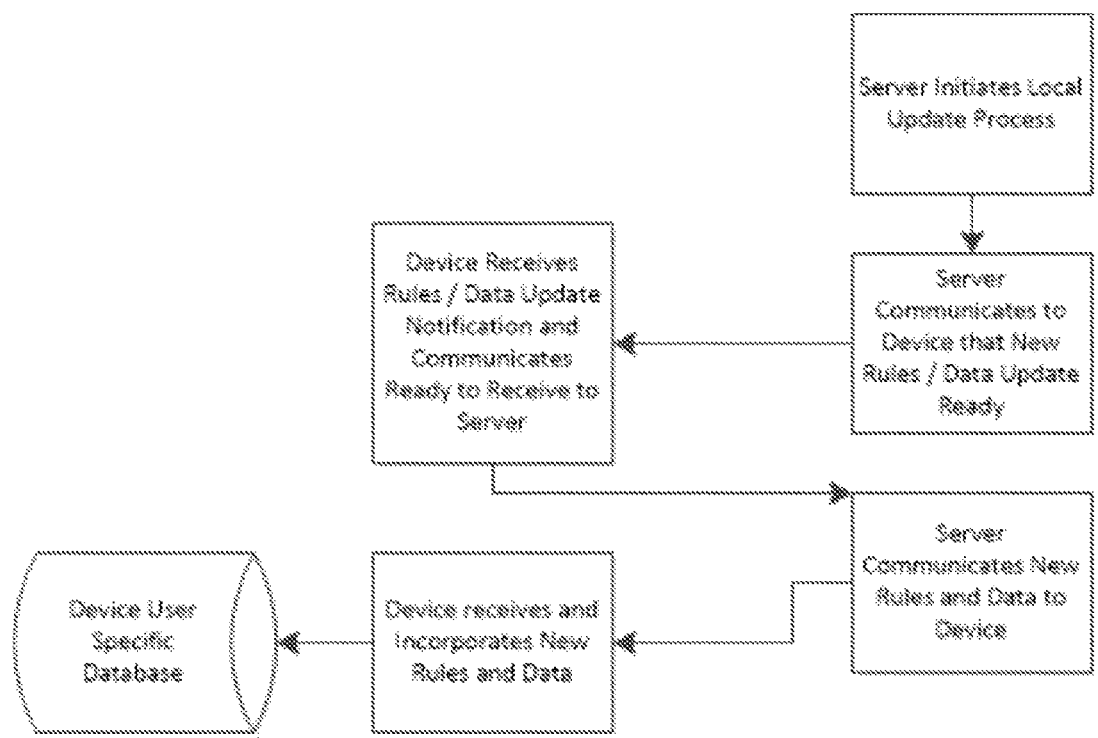
FIG. 5 is a flow diagram depicting the general process of updating a device associated a system described in the application.

FIG. 5 diagrams the general process of updating the device. The server will initiate the device update process by notifying the device that an update is needed. The device receives the notification from the server and prepares for receipt of an update and notifies the server that it is ready for the update. The server communicates the new data and/or rules to the device. The device receives, incorporates, and implements the new data or rules received. The new data or rules are stored locally on the device in a user specific database.

II. Monitor/Communication Device

Certain embodiments are directed to a portable or wearable device that provides for monitoring of and communicating (monitor/communication device) with a subject wearing or in possession of the device. In certain aspects a device provides assistance directly to the user rather than just alerting a caregiver or emergency services. The device is configured to interact with user and provide device queries and receive user input. For example the device remains in a quiet mode, i.e., using non-audible queries to the user, until user input or circumstances require audible output. The non-emergency query can be set to vibrate until over ridden.

Certain embodiments are directed to a device that is worn, is securely attached to the subject, or is continuously in the subject's possession. In other aspects the portable device is incorporated into an assistance system that can monitor and/or communicate with a third party and/or the user. The device can comprise a display, a power source, a sensor(s), a communication component(s) (e.g., speaker, display, vibrator for output, and button(s), touch pad, touch screen, camera, or microphone for input), program storage (control component), and attachment component (e.g., straps, snaps, stretchable band, etc.).

Figure 6:
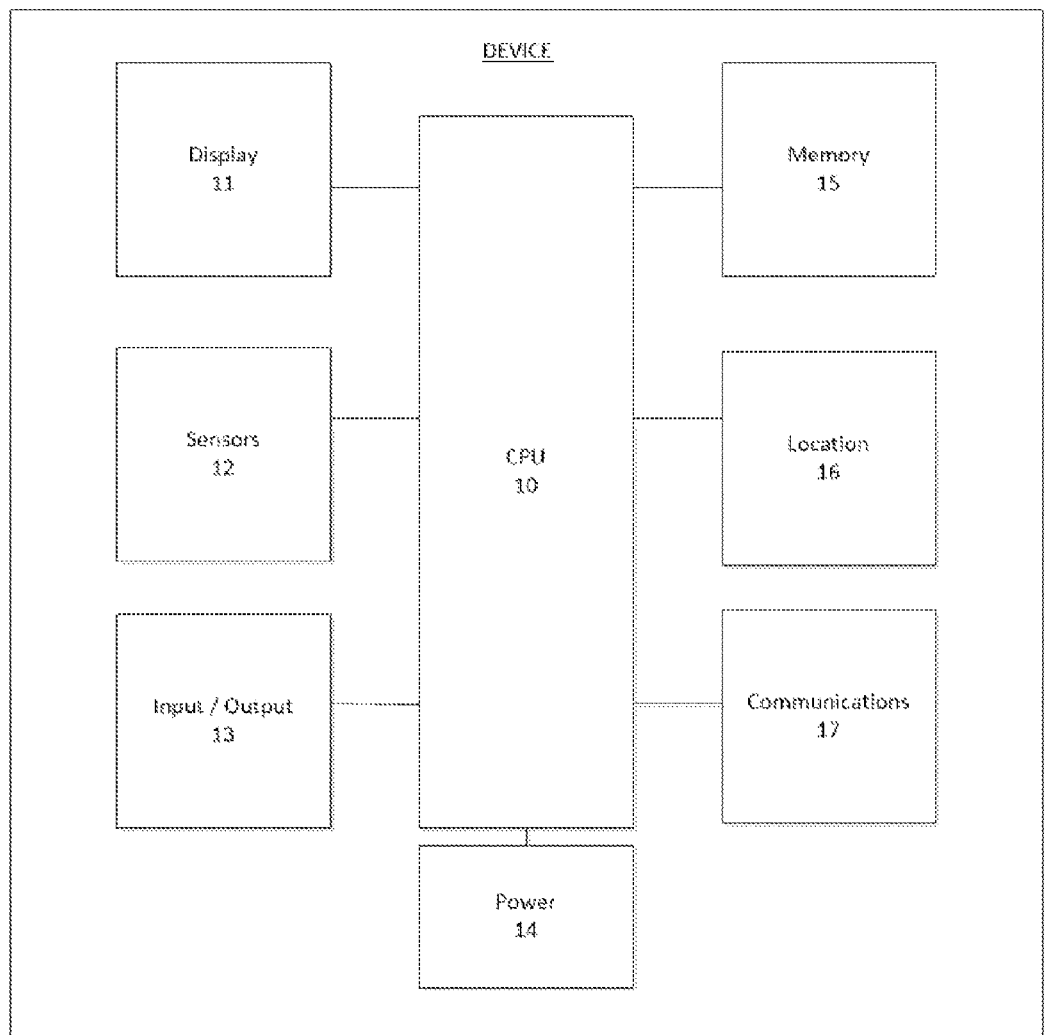
FIG. 6 illustrates a block diagram of one embodiment of a monitor/communication device.

One embodiment of the device can comprise a debugging unit (DEBUG), power unit, global system for mobile communication (GSM) unit, microcontroller unit (MCU), a WiFi/global positioning system (WiFi/GPS) unit, and liquid crystal display (LCD) unit. FIG. 6 illustrates a block diagram of one embodiment of a device. Central processing unit (CPU) or Micro controller unit (MCU) 10 is shown operatively coupled to various components of the device. Display 11, which can be an LCD display, is operatively coupled to CPU 10 and configured to provide visual messages or queries to the user. Sensors 12 are operatively coupled to CPU 10. Sensors can include but are not limited to an ambient light sensor, an accelerometer, a magnetometer, a gyroscope, and temperature sensor. In certain aspect a sensor is a 3-axis accelerometer, 3-axis gyroscope, and a 3-axis magnometer (i.e., a 9-axis accelerometer). The device can be equipped with a battery status LED configured to provide status of battery charge to the user. Input and output component 13 can be incorporated into the device, which can be configured to provide user input to CPU 10 or device output via display 11 or other output devices. Input/output 13 can be coupled to an audio CODEC and amplifier that is operatively coupled to a speaker and microphone enabling audio output to the user and audio input to CPU 10. In certain aspects, a power source 14, such as a battery, is operatively connected to the device. A battery can be configured to interact with a charger. A charger can be a separate charger cradle or accessible via a charging port in the device. In certain aspects one or more batteries can be removed and coupled to a charger cradle or base. CPU 10 is also connected to memory 15. In certain aspects the memory is flash memory. Global positioning functionality is provided by a global positioning system or location 16. Various components can be connected using antennae as required. The device can contain various devices or mechanisms for communication 17. For example, wireless local area network (WLAN) connectivity can be provided by a WiFi component. A vibrating motor can also be included to provide discreet user prompting via vibration. Telecommunications capability can be provided by GSM/GPRS components.

Certain embodiments are directed to a device configured as a wristband. In certain embodiments the wristband can comprise a low power display, user-changeable rechargeable batteries, personal sensor components, and communications components.

Figure 7:
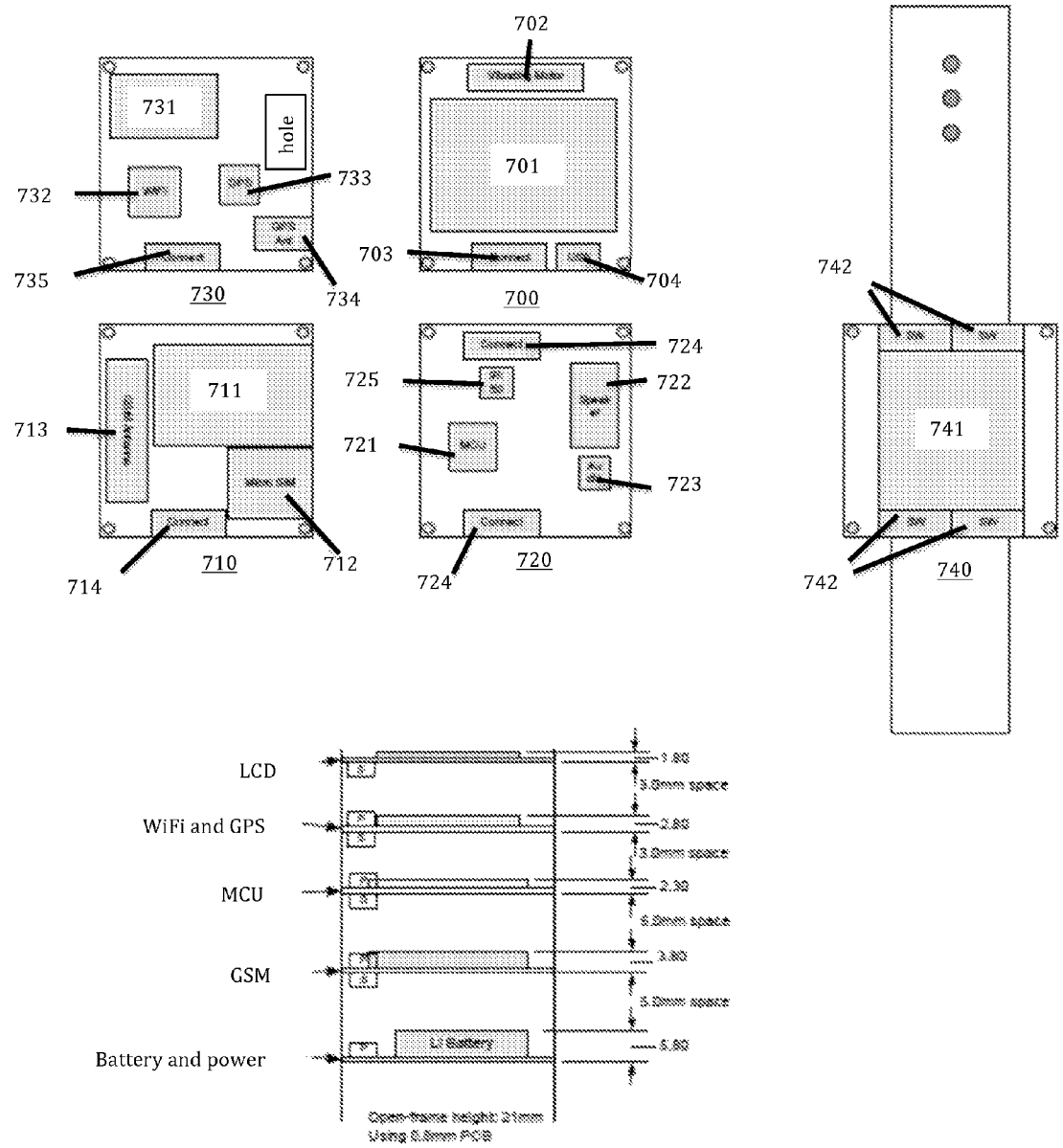
FIG. 7 illustrates a board diagram of one embodiment of the device.

FIG. 7 illustrates a board diagram and layer diagram of one embodiment of a device. A device can have a top and a bottom layer. In certain aspects the bottom layer is a battery and power layer 700. The battery and power layer can contain battery 701 (e.g., a lithium battery), a vibrating motor 702, a network connector 704, and provide for connection with one or more other layers of the device 703. In certain aspects the device can comprise a second telecommunication layer 710 comprising a GSM component 711, a micro SIM 712, an antenna 713, and provide for connection with one to more other layers of the device 714. The device can have a controller layer 720 comprising a CPU/MCU 721, one or more speaker components 722, an audio component 723, a sensor component 725 (MPU-9150), and provide for connection with one or more other layers of the device 724. The device can also include a fourth WiFi/GPS layer 730 that comprises a WiFi antenna 731, a WiFi component 732, a GPS component 733, a GPS antenna 734, and provide for connection with one to more other layers of the device 735. The top layer 740 will comprise a display screen 741 and various switches 742 and/or user interaction capability. The device can include a breakout board for inclusion of additional components and engineering debug usage.

In certain aspects the device is to be worn continuously. As such the device is durable enough to endure falls, bumps, weather, bathing, and the like. In certain aspects the device is waterproof to the extent it can withstand daily hand washing, bathing, showering, and aquatic exercising.

Figure 8:
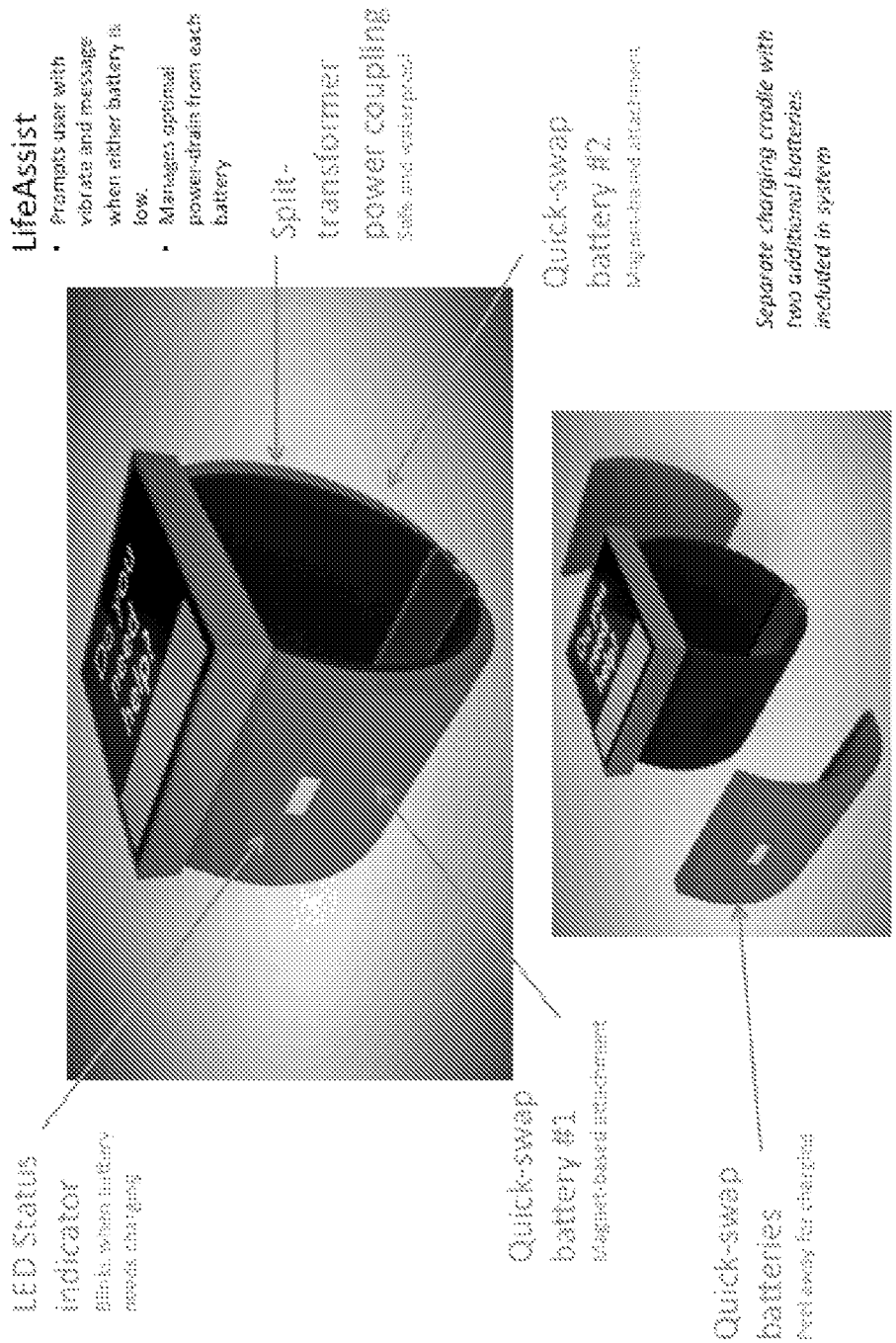
FIG. 8 illustrates one embodiment of a battery system for the device.
Figure 9:
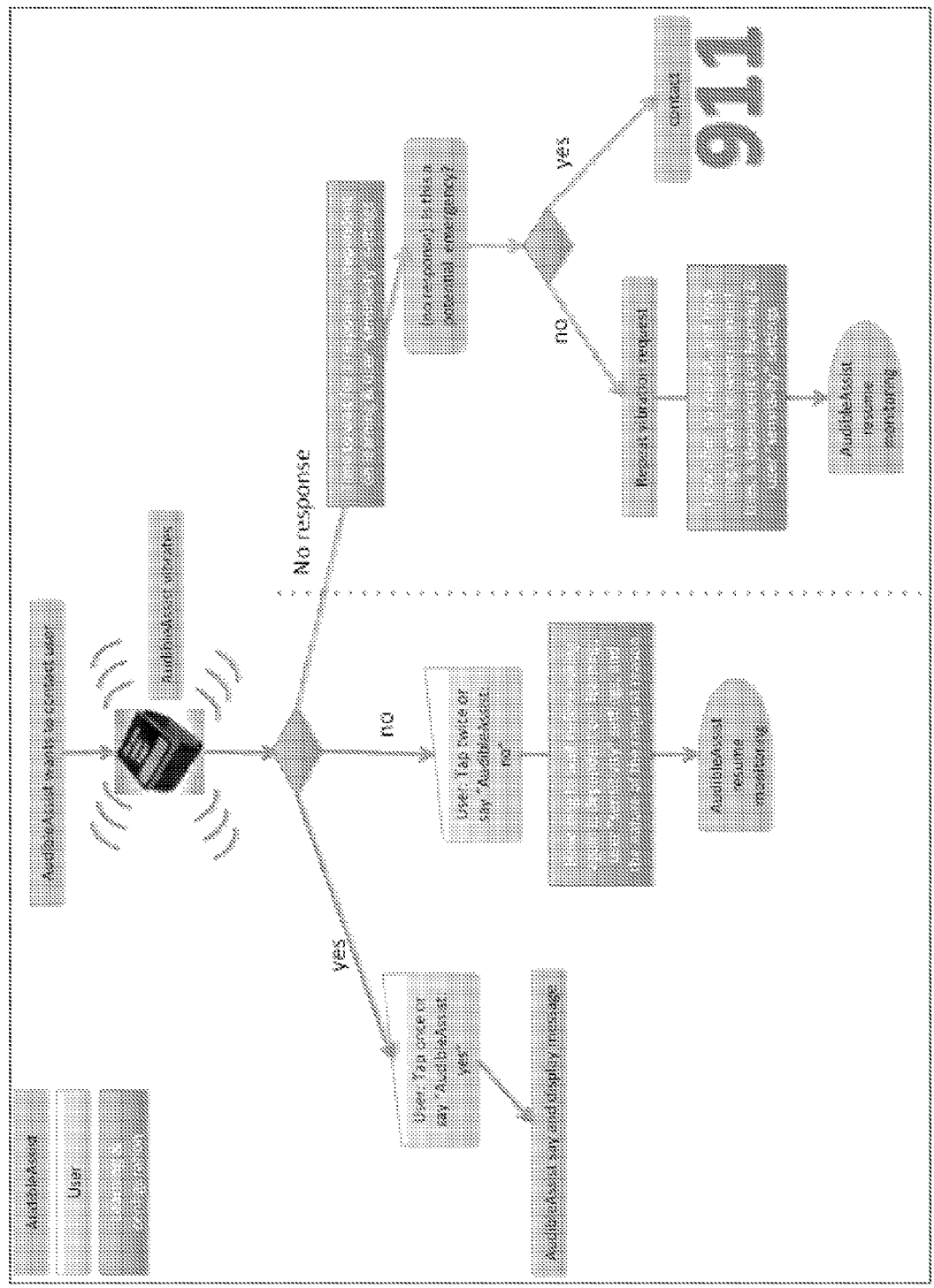
FIG. 9 illustrates certain aspects of the system functionality.

The device is powered using a rechargeable battery system. In certain aspects the battery system is configured to allow the wristband to stay on the user at all times. In certain aspects the battery system is configured so the user does not need to remove the device for charging. One reason for this configuration is that once a user takes the device off, it rarely goes back on. In one aspect the device can provide for plug in charging while still attached to the user. In other aspects the battery system can be configured as a battery swap mechanism having two batteries wherein one battery can be removed and recharged while a second battery powers the device. In this configuration there can be three or four interchangeable batteries that can be used to power the device on a continuous basis. The battery change mechanism can be configured such that it can be performed with one hand. In certain aspects the battery system consists of one (or more) battery "pods" on the wristband (FIG. 8). Each pod has an LED indicating the level of charge. When a pod is yellow or red, the user pulls a tab to remove that pod, and replaces it with a charged one. The pull-tab allows the user to complete the entire battery replacement operation using one hand. At all times, the wristband has power through an internal (not removable) battery or the second (or more) removable battery pod. A charger and additional battery pods can be provided with the device.

In certain aspect a low power display can be a liquid crystal display (LCD), backlight or light emitting diode (LED) display, Organic LED (OLED) display, Memory-in-pixel (MIP) display, or e-paper display. In one aspect the display is capable of displaying a status symbol. The status may be displayed while in stand by mode, upon the occurrence of certain events, or in response to an inquiry. In certain aspects the status symbol can include a color indicator. The status indicator can include green for all is good, yellow for uncertainty, and red for emergency mode. Other colors and indicators can be used in conjunction with various states and circumstances that a user may encounter or be involved in. In certain aspects the device can display various other information when in a stand by mode, such as, but not limited to the time, date, task list, etc.

In certain aspects the device integrates a speaker for audio out and a microphone for speech input. In certain aspects a speaker is incorporated into the strap such that the strap acts as an audio chamber to increase volume and improve tonal quality. The device can be configured to connect wirelessly to the user's hearing aid to provide discreet audio out capability. In a further aspect the device can incorporate a vibration mechanism (e.g., similar to a cell phone on "vibrate mode"). The output mechanisms, such as audio and vibration, can be used to communicate with or provide feedback to the user. Devices described herein can comprise 1, 2, 3, 4 or more input mechanisms. In certain aspects a device comprises at least 1, 2, 3, 4, or more user input buttons or touch pads. In certain embodiments the device comprises at least two user input buttons or touch pads. In a further embodiment at least one user input button or touch pad is located below the display. In a further embodiment, the user input button(s) or touch pad(s) are explicitly not located at the wrist/hand sides of the display, because that location requires dexterity for manual presses and also increases the likelihood of unintentional presses. In a further embodiment, the device utilizes accelerometer sensors as a gesture-driven input mechanism, and has no user input buttons or touch pads. A wrist worn device can be configured to be worn and operated on either the right hand or the left hand of a user.

The device can be programmed or configured to perform a number of functions including but not limited to one or more of providing a medical alert based on personal sensor data and/or user input requests, directional guidance, providing medication reminders, providing personal health test reminders (e.g., daily weight for heart patients, blood pressure tests for hypertensive patients, blood oxygen tests for chronic obstructive pulmonary disease (COPD) patients, blood sugar tests for diabetics), providing doctor appointment and/or pharmacy reminders, audible instruction or inquiry, and audible user input.

The device can be programmed for various operational modes, including but not limited to a learning mode, normal mode, low-power assist mode, high-power assist mode, and emergency override mode.

III. Configuration Options

Because people's needs, expectations, and requirements for support vary there are a number of configuration options relating to sensitivity settings, emergency contact behaviors, location tracking behaviors, and medical compliance information.

The initial configuration options can be defined using a web-based interface using a unique identifier for the device to be configured, e.g., the serial number of the device. Initial configuration can include the setting of passwords and password recovery questions to avoid hacking. Users and their families can configure and modify the settings or a third party can be employed to aid in the initial and subsequent configuration.

In certain aspects the device is configured to communicate via a wireless local area network (WLAN), e.g., a Wi-Fi system. In a further aspect the device will communicate, when appropriate, via the user's home WLAN. Any number of WLAN router or systems can be used, such as an Apple Airport Express™. The configuration options can include, but are not limited to one or more of the following:

A. Device Name

In order to enable verbal instruction reception the device needs to know the user is addressing the device. A default name such as "AudibleAssist" can be pre-configured. The user can change the pre-configured device name, e.g., the user can name the device "Fred Astair". Speaking the name of the device would engage the device to receive verbal input(s).

B. Location

Various modes of location identification can be set. For example the device could be set to allow continuous transmission of location to a trusted group or at pre-determined times, during emergency mode, or not to transmit location. Other configurations of the device can allow user to provide a password for enabling retrieval of location information by a trusted group. The system can also contact trusted group members by email to provide links for location access. As used herein a "trusted group" is a configurable group of people or organizations that are allowed access to the device and system, for example family members, caregivers, and law enforcement. Emergency medical services providers can be given access to the device and system during an emergency, using identification information that ensures that they are present with the device user. If configured as such, the trusted group is contacted during emergency mode with location information. The mechanism of contact can be computer-generated phone call, text message, email or any other communication method that can be programmed or directed by the device or system. In certain configurations, location is always provided to emergency medical personnel when medical alert mode is activated, regardless of the privacy settings.

C. Medical History

The device can be configured to provide various aspects of the user's medical history. Medical history can include data to assist emergency medical personnel, such as physician contact information, medications, or allergies. Limited access to medical history can be provided by an access key that can be vetted by the system. A person entering a valid key will be allowed access to the medical history. In certain aspects a key code can be provided on the device. The key code can be entered via a web interface or provided through other communications mechanisms such as a phone call and if the device and/or the person requesting access is registered then that person is allowed access to medical history. In certain aspects the key can be activated by other events monitored by the device, such as an emergency alert or a medical alert, otherwise the use of the key will not allow access to medical history.

D. Sensitivity

Various thresholds for the various functions of the device can be set to accommodate user characteristics. These thresholds will help in identifying aberrant activity and distinguish from normal variances in patterns to minimize false alarms. Parameters to be considered in setting sensitivity include but are not limited to age, activity level, gender, weight, and current restrictive issues. Questions may be presented to the user upon setting up the device in order to synthesize the appropriate level of sensitivity for the device. The sensitivity level indicates the likelihood that the user will need assistance and thus influences how long the device or system waits for a response in a suspected emergency. The sensitivity setting can also be used in determining the amount of deviation from normal patterns before the device or system queries the user.

E. Compliance Features

In certain embodiments compliance features can be included. An individual can configure the compliance features in the device to meet their specific needs. As an example, an individual may choose to enable or disable drug reminder compliance features. In certain embodiments compliance features can be mandatory, for example this aspect can be used for individual having a high-risk for adverse event(s).

F. Privacy Factors

In keeping with the behavioral theme of unobtrusive assistance with dignity, most privacy settings are controllable through configuration. In addition to those settings that are configurable, data being transmitted to and from the device (such as location data) can be encrypted.

IV. Functionality and Methods of Use

Various functionalities can be included in various embodiments of devices, systems, and methods described herein.

A. Communication Mode

The device can be configured to communicate with the user. In certain aspects the device queries the user by vibrating and waiting for a response from the user. The user can press a button once for yes indicating the user is in a situation in which the user is able to communicate with the device resulting in communication from the device via visual or audible communication. If, for example, the user was in a situation in which it was inconvenient to communicate the user could press a button twice to indicate no do not communicate at that time. This feature allows the user to control the timing of communication and may help reduce embarrassing or inappropriate communication, thus helping in maintaining the user's dignity.

Another option that can be configured separately or in conjunction with the vibration indicator is a verbal response detector. The device can be configured to receive a verbal user response such as "AudibleAssist: Go ahead" or "AudibleAssist: Not now". The verbal response mode can be used as a hands free communication method that does not involve the physical touching or pushing of a button(s). In certain embodiments a touch sensitive pad can be incorporated and configured to recognize various hand or finger gestures that are correlated with a response, for example a swipe read by the touch sensor might suffice for yes/no. In other aspects a single finger swipe may indicate yes and a two-finger swipe may indicate no. In still a further aspect the direction of a swipe can indicate a response, for example a swipe away from the user may indicate "no" or a negative response, and swipe toward the user may indicate "yes" or an affirmative response. In certain embodiments, a simple tap on the display can be recognized by the wearable device as user responses, for example, one tap indicating "yes" or an affirmative response; two taps indicating "no" or a negative response; and three taps indicating "help", which may be a request for help with the device or a request for assistance.

The time between device query and expected user response can be set using a configuration menu. This time for response setting can be based on a number of considerations, including the device's mode of operation, previous times for response (e.g., the learned response time window (typical response times for this user)), and configured "sensitivity" setting (pre-determined response time). In suspected emergency situations (e.g., accelerometer suspects a vehicle crash), the response time will typically be relatively short, as the user may not be conscious and therefore would be unable to respond in such situations. In non-emergency assistance situations, the response time setting can be relatively long including ignoring the query altogether. Thus, in a non-emergency setting a user could respond with a yes communication or ignore the query to establish a do not communicate response.

Data obtained by the device over time in conjunction with data provided by the user can be used by the device or system to establish hourly, daily, weekly, monthly, or yearly life patterns for a user. The device can send a query to the user when an aberration or break in one or more patterns is detected. Each aberration or break can be categorized either by default, past experience, or user determined urgency. The device will act as appropriate given the urgency assigned to the detected event. Those events associated with a higher level of urgency will be associated with a more rapid and escalating response to an ignored device query. In certain aspects the response to a query can include instruction to ignore the aberration or break for a period of time. For example, perhaps the user is visiting relatives over the holiday. The location of the individual may register as an aberration or break and trigger a device query. The device can be configured to allow the user to respond to the query and indicate this aberration or break be ignored for the extent of the trip.

User responses to a device query can be in the form of a verbal and/or touch response. When users want to speak to the device they can either press a button to activate a microphone or by addressing the device with one or more key words. Once activated the device or system will follow with a series of queries to define the assistance needed. For example, a user in need of emergency assistance can press a button during learning mode or normal mode and device can respond by displaying and/or audibly asking the user "Do you need help?" If the user responds verbally or with a touch indicating "yes" the display and/or speaker will ask, "Call 911?" If the user responds with a "yes" the device will follow either a default response or a user determined response to a 911 request.

The routines and key words for communicating with the device can include default and user defined words or phrases. Trigger words may be used to activate the communication mode. In certain embodiments verbal commands are preceded by the device's name, which is set during initial configuration of the device. As mentioned above, the default name can be "AudibleAssist" or some other manufacturer determined name. Commands may include "Help" followed by one or more queries to determine the type of help, e.g., determine if a trusted person needs to be contacted, if 911 should be contacted, if location needs to be communicated, and/or if any additional data needs to be provided to the user; "911" for contacting 911 and providing any data needed for emergency response; "Directions home" for providing direction to the user's home (in certain aspects other destinations can be included that would replace the word "home" in the query); "Speak to (a particular person or call a particular phone number)" for example can initiate a voice over internet protocol (VOIP) call to an agent); "yes" conveying affirmance of a device query; "go ahead" or "speak to me" to activate or allow audible communication with the user; "no" conveying a negative response or decline of a device query; and "not now" or "don't speak to me right now" conveying a need to delay audible communication with the user. Any number of device query/response routines can be programmed.

In certain embodiments a user's speaking the device name will trigger a recording mode that records while local continuous speech recognition identifies key words. If no key word is detected, the recorded audio can be sent to the cloud for natural language processing. If it is still not possible to figure out what the user said, the recorded audio is sent to an agent for human processing.

B. Learning Mode

A learning mode is initiated when the device is new to a user, after a "Reset to factory defaults" selection, or when another life event occurs such as transitioning to a mobility aid. In learning mode, the device performs a subset of functions such as emergency medical alert functions. The learning mode includes a learning period where the device is accumulating data and learning the "personality" of the user, which may include logging daily activities, and creating a knowledge base of user-specific typical behaviors and patterns. Learning mode is initiated or the learning period begins with an initial download of configuration options. The initial specification for the learning period can be based on a default setting or a user determined time period. In certain aspect the learning period is at most, at least, or about 1, 2, 3, 4, 5, 6, 7, 8, 9, 10, 11, 12 or more weeks or months, including all values and ranges there between. In certain aspects the default learning period is one, two, or three weeks. During the learning period, the device will not query or "speak" to the user except as needed in suspected or known emergency medical alert situations.

Data during and after the learning period is collected, summarized, and transmitted to a cloud-based computing facility(ies). Engines in the cloud analyze the data and create or update behavioral rules for users. When rules have been created or updated, they are automatically and autonomously downloaded to the user's device without interruption of functionality.

During the learning period and periodically thereafter, the sensor and location data from a particular user device is analyzed to determine what rules are appropriate for that user. The data analysis is primarily conducted in cloud-based servers. The analysis creates a map of typical user locations, behaviors, and activities. The map includes sensitivity-based (from the user's sensitivity inputs during configuration) fuzziness for a particular user's rules that account for normal variations in the data. Examples of such rules are provided in the following scenarios:

Scenario A—A user typically wakes up and wanders around her home between 7 am and 9 am, and her sensitivity level is moderately low. If it's 11 am and the device has not detected wakeful movement the device will send a device query (i.e., ask to communicate or speak with her) to confirm she is okay and not in need of assistance. If a satisfactory response is not received, the device can signal the system to initiate the appropriate procedure, such as a welfare check.

Scenario B—A user typically goes to the grocery store on Thursday afternoons. One Thursday afternoon, he goes to the grocery store but then turns left out of the grocery store parking lot. Typically on Thursdays he turns right out of the grocery store parking lot. A device query will be generated that ask to communicate or speak to him to determine if he needs assistance. Perhaps he has temporarily forgotten that to go home he must turn right. The device can provide directions or contact help as needed.

Scenario C—For embodiments including compliance functions, rules also include notification and active acknowledgement of compliance requirements (e.g., take drugs, take health-related measurements, etc.).

C. Normal Mode

Normal mode is the most common mode of operation. In normal mode, the device is scanning sensors for emergency situations, checking behaviors and locations against locally stored personal behavior patterns (local rules), and is available for user input requests for assistance. Normal mode conserves power as much as possible, based on recent activity and user history.

In certain embodiments a device can be configured to monitor the motion and movement of an individual. The system can use local and cloud computing to assess cognitive and physical impairment based on the data collected regarding the motion and movement of the subject wearing the device. In other aspects the device can monitor battery replacement by the user and incorporate that data into assessment of user's cognitive and physical functions.

D. Medical Alert Mode

One feature that can be included in a device or system is the medical alert mode. There are a number of ways to enter the medical alert mode, including sensor data indicating that a medical alert is likely (e.g., accelerometer detects a fall or a car crash), user touch input indicates a medical alert situation, and/or user voice input indicates a medical alert situation. If the medical alert is triggered by sensor data, there is a short period of communication with the user to determine if there is a need for assistance. If the user does not respond to a request to communicate, then emergency services are contacted (e.g., 911) is contacted. If the medical alert is triggered by the user, the system may first ask if they want 911 assistance, or for their trusted contacts to be contacted. If the answer doesn't make sense or otherwise indicates an emergency situation, or the answer is incompletely provided (they say "no" to 911, but then don't respond to the trusted contacts question), then 911 is contacted. In the event 911 is contacted, standard procedures for contacting 911 are programmed based on the location of the user and followed by the device and/or the system.

E. Data Reception Mode

In certain embodiments various data can be pushed to users, e.g., weather warnings, health warnings, personal messages, care-giver messages, or other types of data that may be useful to the user. In certain aspects the types of data pushed to the user can be customized by the user by altering the configuration options of the device or system.

V. Power Modulation

Depending on user behavior, a device described herein can operate in different power domains. FIG. 13 illustrates various power states used for power conservation, where "data processing" indicates where the computational activity is occurring: "little" is computation in the AudibleAssist wristband, and "big" is computation that occurs on servers in the cloud. In an emergency—power states "High Assist" and/or "Exception"—the wristband will maintain communications with the user and emergency services without regard to conserving battery power. Not all user interaction in the "High Assist" or "Exception" power states result in a 911 request for assistance. However, if the wristband is in "High Assist" or "Exception" power state and power reserves are low, it will ensure a contact to 911 with GPS location information before battery power is depleted.

VI. Compliance Feature Requirements

To enable compliance features such as drug compliance, doctor's visit reminders, periodic health-related activities such as blood glucose checks, oxygen level checks, weight checks, and blood pressure checks, there is additional software to enable the rapid configuration and maintenance of these features by owners, family members, insurance companies, pharmacy benefit managers, and physician's offices. With the appropriate passwords and security features, web forms on the life assist servers can be used to configure and maintain compliance information. In addition, EDI (electronic data interchange) standards (HIPAA 5010) will be used to take compliance information directly from insurers, pharmacy benefit managers, and physician's offices to configure and maintain compliance information for device users.

Embodiments of the device and systems supporting the same can be provided in configurations optimized for specific markets. In certain aspects the device can be initially configured for drug compliance. A drug compliance configuration may or may not be user configurable. For example, an insurance company may issue the device to the insured and not allow user configuration. In a further aspect a device may include a doctor visit compliance routine that may include reminders for office visits, current wait times, and the like. In still other aspects a device can provide reminders for self-administered monitoring or tests, e.g., blood glucose tests, etc. In certain aspects the device can provide reminders for other periodic health-related activities, e.g., check blood oxygen level, check blood pressure, etc.

Certain embodiments can be configured for health monitoring. In certain aspects the device can include standard 5- or 7-lead sensors to capture and transmit heart data via the device. In another example the device can be configured to interact with oxygen and pulse sensors either directly or indirectly coupled to the device. In one example a separate fingertip sensor can be in communication with the device, such communication can include, but is not limited to Bluetooth Low Energy (BLE) connections and the like.

Figure 10:
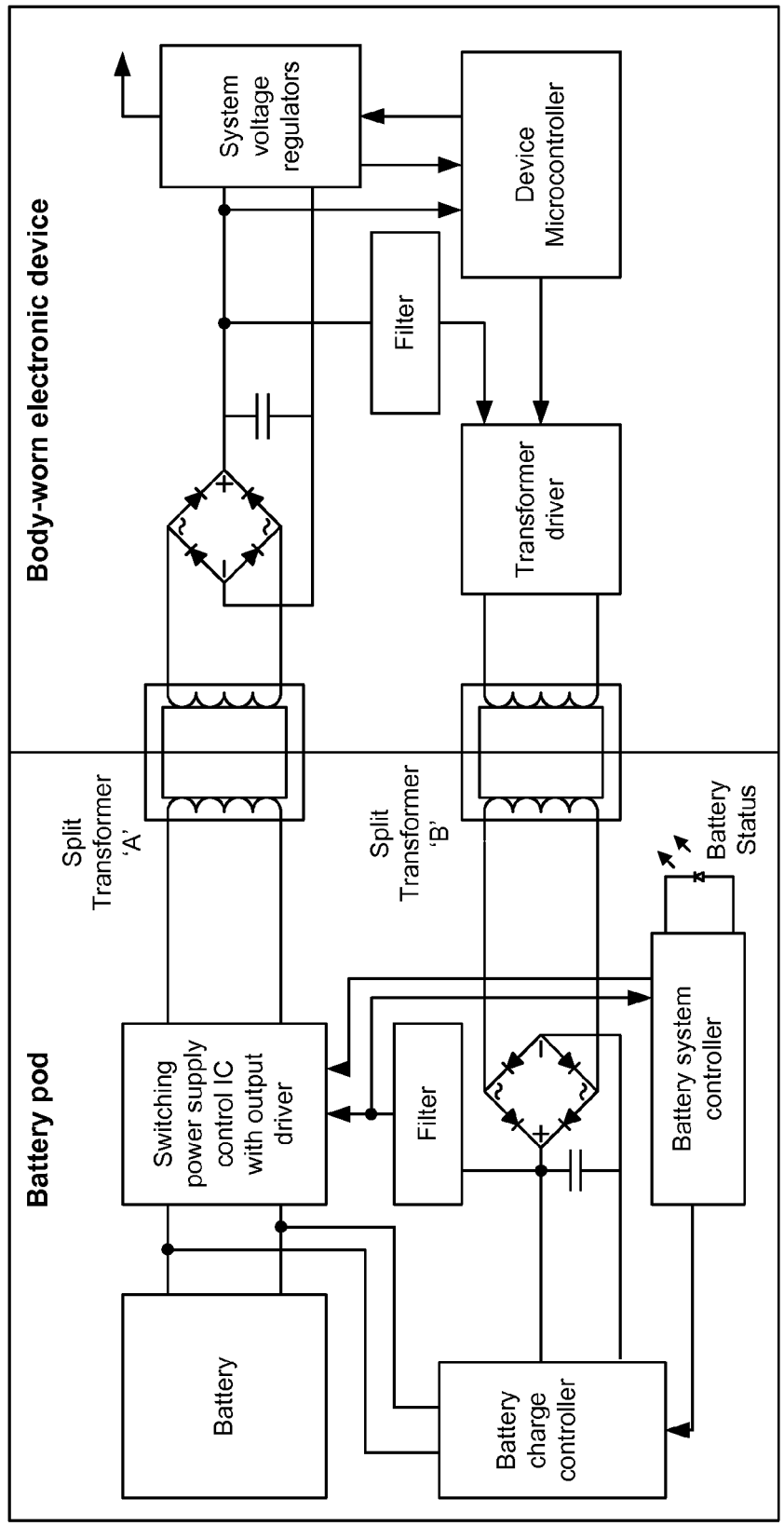
FIG. 10 illustrates a block diagram of one embodiment of the battery system, where the battery pod is connected to the device.

FIG. 10 illustrates a block diagram of one embodiment of the battery system, where the battery pod is connected to the device. In this system power is transferred from the battery pod via a split transformer to the device. The split transformer arrangement removes the requirement for external electrical contact points. In certain aspects, the battery pod can be sealed and water-tight to the degree required by the environment. The absence of electrical contacts, which are subject to corrosion and negative effects of electrolysis due to electrical currents, minimize the degradation of the battery system. This battery system allows the battery to be reliably and safely used while submerged or wet with a range of fluids.

In certain embodiments the battery system comprises a lithium ion battery or lithium ion polymer battery which supplies power to a switching power supply control IC. The control IC drives split transformer A directly or indirectly with an AC switching waveform appropriate to the size and construction of the transformer such that energy is optimally transferred to the diode rectifier in the device. A capacitor provides filtering on the DC rail which is then provided to system voltage regulators.

A feedback loop through split transformer B provides voltage regulation to the system. It also serves as a signal path where the device microcontroller can control the state of the battery pod. To enable efficiency over a wide range of power loads, the device microcontroller can instruct the battery pod to pause operation. This creates discontinuous operation where the switching circuit only operates when required. Power is provided at the optimal operating point as determined by the device microcontroller in the context of overall system operation. The microcontroller can initiate continuous operation in anticipation of a high-load event such as radio transmission.

To avoid the battery attempting to couple power into an object other than the device, the battery system controller monitors the feedback loop. The switching power supply will be disabled if the phase and magnitude of the feedback signal do not match defined characteristics.

The battery charge controller is disabled while the battery is powering the device.

In an extension of this design, the device can signal the battery system controller to power down all functions except for a low-power wake timer. After a fixed interval the battery will resume discontinuous operation. This achieves extremely low power operation compared to other methods and is particularly applicable where there is a plurality of battery pods and one or more battery pods are not needed to provide power.

In certain aspects, the device microcontroller monitors the control loop to verify that the power transfer is efficient. By measuring the voltage ripple characteristics, the device microcontroller can determine if the battery is not inserted correctly. A warning can be provided to the user to re-insert the battery and/or clear debris.

The described method, including intelligent discontinuous operation of the power circuit, provides high efficiency power transfer over a wider power range, from the device's lowest power states to full power for operation of radio transmitters and audio output.

The battery status indicator serves to provide a direct visual cue to the user which one of the two or more batteries needs charging. One or more LEDs may be used to provide a color-coded indication of battery state.

Figure 11:
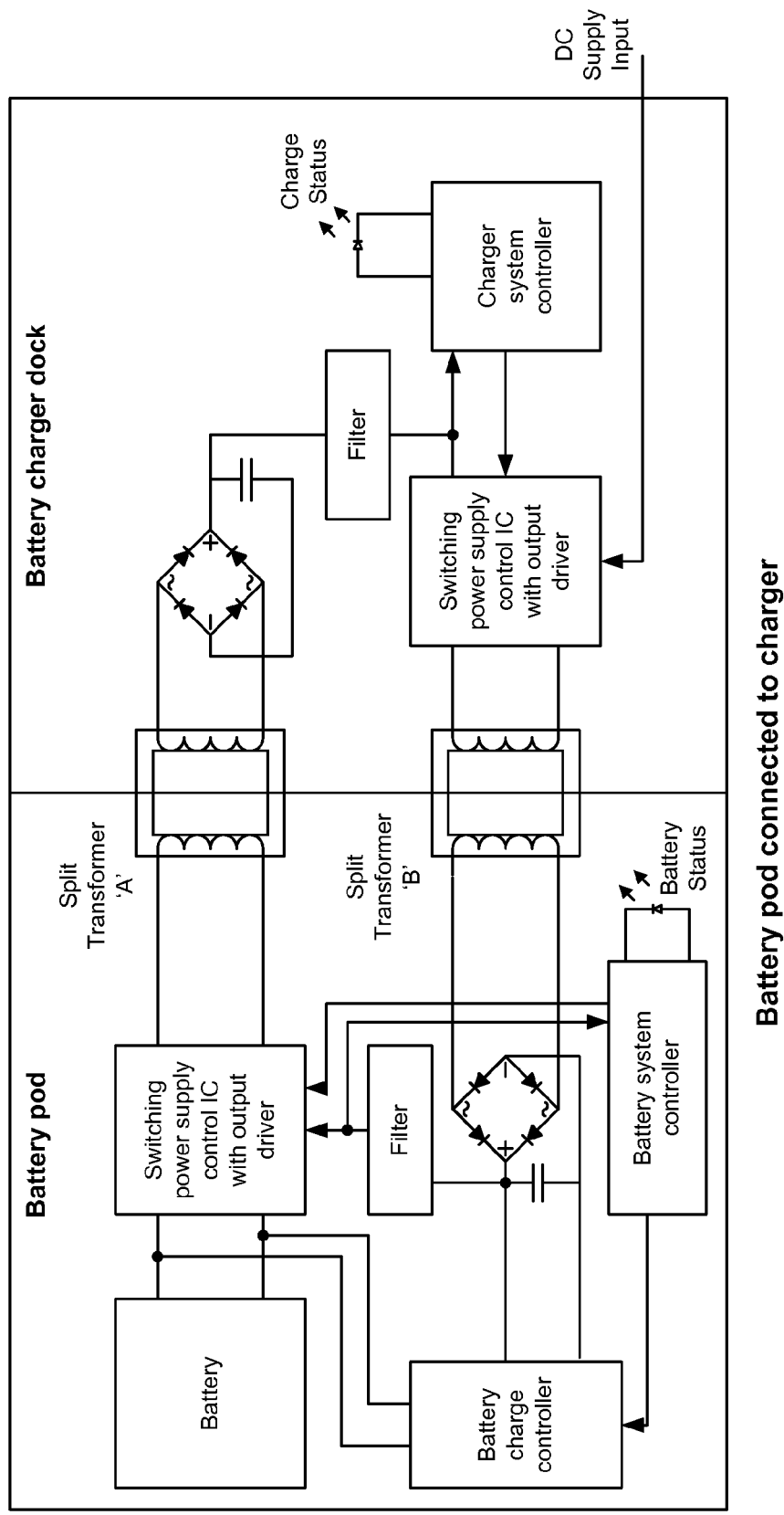
FIG. 11 illustrates a block diagram of one embodiment of the charging system, where the battery pod is connected to the charger for charging.

FIG. 11 illustrates a block diagram of one embodiment of the charging system, where the battery pod is connected to the charger for charging. The charger dock comprises a power system controller, switching power supply, rectifier, filter, and two split transformer halves. The charger may have one dock, or more than one dock to allow simultaneous charging of multiple battery pods.

In one embodiment of the charging system, the charger uses split transformer A as the feedback loop. Split transformer B provides the power transfer stage. The battery system controller modulates the feedback loop through transformer A to indicate charge status and charge exceptions to the charger system controller.

Figure 12:
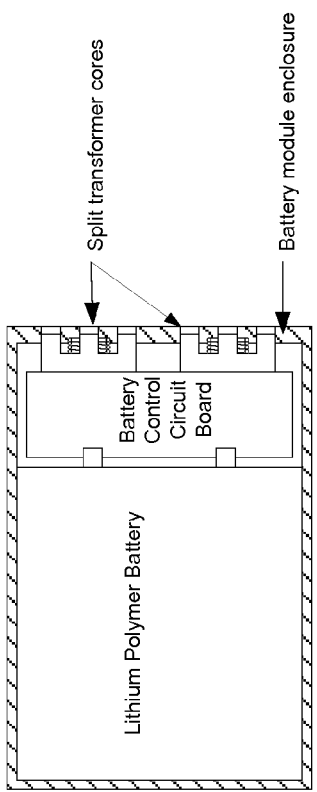
FIG. 12 illustrates a potential mechanical implementation of the battery pod and device dock.
Figure 12:
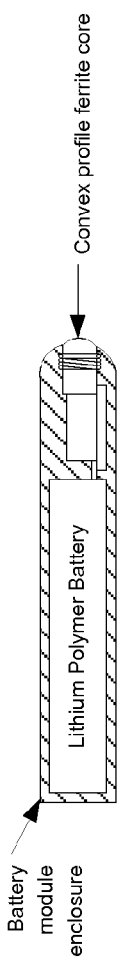
Figure 12:
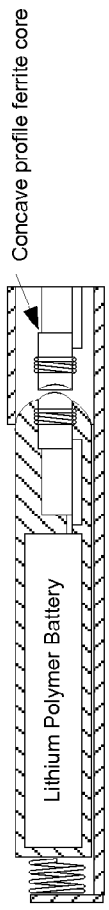

FIG. 12 illustrates a potential mechanical implementation of the invention. The design allows the battery system to be completely encased such that only one face of the transformer cores is exposed. The case is sealed in the factory to provide the required degree of moisture protection.

The illustration shows the split transformer core with convex and concave profiles to assist with minimizing the air-gap in the magnetic circuit. This configuration allows for a degree of misalignment in between the device and the battery pod. Benefits include the ability to maintain efficient energy transfer when debris is present between the battery pod and the device. The convex and concave assignments may be reversed such that the battery has a concave face and the dock has a convex face. Use of flat-faced cores made of ferrite is an alternative low-cost implementation.

A simple mechanical spring of some design keeps the battery pod in place and minimizes the air gap across the transformer.

VII. Computer Implementation

Embodiments of systems and/or methods described herein can be implemented by or are executed by one or more computer systems. In various embodiments, a computer system may be a server, a mainframe computer system, a workstation, a network computer, a desktop computer, a laptop, or the like. For example, in some cases, the methods described herein may be implemented as a computer system. Moreover, one or more of servers or devices may include one or more computers or computing devices generally in the form of a computer system. In different embodiments these various computer systems may be configured to communicate with each other and devices described herein in any suitable way, such as, for example, via a network.

The computer system may include one or more processors or controllers coupled to system memory via an input/output (I/O) interface. Computer systems may further include a network interface coupled to I/O interface, and one or more input/output devices, such as speech control device, audio output device, cursor control device, keyboard, and display(s). In some embodiments, one or more aspects of the methods described herein may be implemented using a single instance of a computer system, while in other embodiments multiple systems, or multiple nodes making up computer system, may be configured to host different portions or instances of embodiments. For example, in an embodiment some elements may be implemented via one or more nodes of a computer system that are distinct from those nodes implementing other elements.

In various embodiments, a computer system may be a single-processor system including one processor, or a multi-processor system including two or more processors (e.g., two, four, eight, or another suitable number). Processors may be any processor capable of executing program instructions. For example, in various embodiments, processors may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors may commonly, but not necessarily, implement the same ISA. Also, in some embodiments, at least one processor may be a graphics-processing unit (GPU) or other dedicated graphics-rendering device.

System memory may be configured to store program instructions and/or data accessible by one or more processor. In various embodiments, system memory may be implemented using any suitable memory technology, such as static random access memory (SRAM), synchronous dynamic RAM (SDRAM), nonvolatile/Flash-type memory, or any other type of memory. Program instructions and data implementing certain operations, such as, for example, those described herein, may be stored within system memory as program instructions and data storage, respectively. In other embodiments, program instructions and/or data may be received, sent or stored upon different types of computer-accessible media or on similar media separate from system memory or computer system. Generally speaking, a computer-accessible medium may include any tangible storage media or memory media such as magnetic or optical media—e.g., disk or CD/DVD-ROM coupled to computer system via I/O interface. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via a network interface.

In certain aspects, an I/O interface may be configured to coordinate I/O traffic between processor, system memory, and any peripheral devices in the device, including network interface or other peripheral interfaces, such as input/output devices. In some embodiments, I/O interface may perform any necessary protocol, timing or other data transformations to convert data signals from one component (e.g., system memory) into a format suitable for use by another component (e.g., processor). In some embodiments, I/O interface may include support for devices attached through various types of peripheral buses, such as a variant of the Peripheral Component Interconnect (PCI) bus standard or the Universal Serial Bus (USB) standard, for example. In some embodiments, the function of I/O interface may be split into two or more separate components, such as a north bridge and a south bridge, for example. In addition, in some embodiments some or all of the functionality of I/O interface, such as an interface to system memory, may be incorporated directly into processor.

A network interface may be configured to allow data to be exchanged between computer system and other devices attached to a network, such as other computer systems, or between nodes of computer system. In various embodiments, network interface may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices may, in some embodiments, include one or more display terminals, keyboards, keypads, touch screens, scanning devices, voice or optical recognition devices, or any other devices suitable for entering or retrieving data by one or more computer system. Multiple input/output devices may be present in computer system or may be distributed on various nodes of computer system. In some embodiments, similar input/output devices may be separate from computer system and may interact with one or more nodes of computer system through a wired or wireless connection, such as over network interface.

Memory may include program instructions, configured to implement certain embodiments described herein, and data storage, comprising various data accessible by program instructions. In an embodiment, program instructions may include software elements of embodiments illustrated herein. For example, program instructions may be implemented in various embodiments using any desired programming language, scripting language, or combination of programming languages and/or scripting languages (e.g., C, C++, C#, JAVA®, JAVASCRIPT®, PERL®, etc). Data storage may include data that may be used in these embodiments. In other embodiments, other or different software elements and data may be included.

A person of ordinary skill in the art will appreciate that a computer system(s) described are merely illustrative and is not intended to limit the scope of the current disclosure. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The invention claimed is:

1. A wearable device adapted to monitor a wearer's physical activity patterns and to provide assistance to the wearer, comprising:
a power source;
a processor;
at least one physiologic sensor that provides sensor data of the wearer to the processor;
a user interface connected to the processor and adapted to interact with the wearer and to provide information to the wearer;
a network interface configured to provide a network connection between the device and a server; and
a memory coupled to the processor, said memory storing program instructions that, upon execution by the processor, cause the device to collect, from the at least one physiologic sensor, activity data necessary to determine the physical activity pattern of the wearer over time, to provide the collected activity data to said server via said network interface for processing to create or update behavioral rules for the wearer, said behavioral rules being representative of an activity profile of a physical activity pattern of the wearer over time that is created and updated using historical wearer data including location mapping of the wearer over time, identification of a home area, location boundaries, sleep/wake cycles of the wearer, location time comparisons over different time periods, and physiological sensor measurements, to receive the behavioral rules from the server for comparison to received activity and location data, and to provide to the wearer via said user interface assistance information when a check of the wearer's activity and location against the behavioral rules indicates that the wearer is not following the activity profile and may need assistance.

2. The wearable device according to claim 1, wherein the wearable device is configured to be worn on the wrist of the wearer.

3. The wearable device according to claim 1, wherein the network interface is a wireless interface.

4. The wearable device according to claim 1, wherein said at least one physiologic sensor comprises a gyroscope sensor configured to detect a falling incident and a global positioning sensor to determine location of the wearer.

5. The wearable device according to claim 1, wherein the user interface comprises a continuous speech recognition interface configured to enable speech interaction by the wearer with the device.

6. The wearable device according to claim 5, wherein the speech recognition interface is configured to receive and to transmit a request for assistance by the wearer to the server via said network interface and to audibilize instructions and queries that offer assistance to the wearer.

7. The wearable device according to claim 5, wherein the assistance information provided via said user interface to assist the wearer includes directional guidance, medication reminders, personal health test reminders, doctor's appointment and pharmacy reminders, or audible instructions or inquiry through the speech recognition interface.

8. The wearable device according to claim 1, wherein the power source comprises a battery system having at least two removable batteries configured to be removed independently such that one removable battery can be removed using one hand without disrupting the function of the wearable device or removing the wearable device from the wearer.

9. The wearable device according to claim 1, wherein the battery system comprises split transformers.

10. A system adapted to monitor the physical activity patterns of the wearer and to provide assistance to the wearer when a need for assistance is indicated, comprising:
the wearable device of claim 1 adapted to be worn by the wearer; and
at least one server connectable to the device via said network interface, said server adapted to receive the collected activity data from said device via said network interface for processing to create or update behavioral rules for the wearer, to provide the behavioral rules to the device, and to provide the assistance information to at least the wearer when the wearer has requested assistance.

11. The system according to claim 10, wherein the server is adapted to process the collected activity data to recognize physical activity patterns of the wearer over time and to update the behavioral rules accordingly, to anticipate physical activity patterns of the wearer over time, and to communicate with at least the wearer via said network interface to offer assistance information responsive to a request for assistance or an indication that the received activity and location data is not in compliance with said behavioral rules.

12. The system according to claim 10, wherein the server is configured to process activity data from a plurality of wearable devices and is configured to send individual instructions to individual wearable devices.

13. The system according to claim 10, wherein the server is configured to communicate with third parties when the person has requested assistance or the processing of the received activity and location data in accordance with said behavioral rules indicates that that the received activity and location data is not in compliance with said behavioral rules.

14. The system according to claim 10, wherein the server is configured to enable a user to create behavioral rules and to adjust sensitivity settings for the device, emergency contact behaviors, location tracking behaviors, and/or medical compliance information.

15. The system of claim 10, wherein the server is adapted to create a map based on location data provided by the device and to communicate the map to the wearer, including location mapping of the wearer over time and location boundaries of the wearer, to identify sleep/wake cycles of the wearer, to identify correlations between time and location of the wearer, and to identify normal ranges of physiologic parameters from the sensor data.

16. A method of monitoring physical activity patterns of a person and to provide assistance to the person, comprising:
collecting activity data of the person over time using a wearable device including at least one physiologic sensor and a location sensor;
providing the activity data from the wearable device to a server via a network interface;
the wearable device receiving information from the server via said network interface; said information including behavioral rules for the wearer derived from the activity data, said behavioral rules being representative of an activity profile of a physical activity pattern of the wearer over time that is created and updated using historical data including location mapping of the person over time, identification of a home area, location boundaries, sleep/wake cycles of the person; location time comparisons over different time periods, and physiological sensor measurements;

comparing collected activity data to the behavioral rules to recognize that the person is not following the activity profile and may need assistance; and providing assistance information to the person via a user interface of the wearable device when a check of the person's activity and location against the behavioral rules indicates that the person is not following the activity profile and may need assistance.

17. The method according to claim 16, wherein the assistance information provided via said user interface to assist the person includes directional guidance, medication reminders, personal health test reminders, doctor's appointment and pharmacy reminders, or audible instructions or inquiry through a speech recognition interface of the user interface of the wearable device.

18. The method according to claim 16, wherein the behavioral rules comprise results of processing of the activity data by the server to recognize physical activity patterns of the person over time.

19. The method according to claim 16, further comprising communicating with third parties when the person has requested assistance or comparison results indicate the need for assistance.

20. The method according to claim 16, further comprising enabling a user to create behavioral rules and to adjust sensitivity settings for the wearable device, emergency contact behaviors, location tracking behaviors, and/or medical compliance information.

\* \* \* \* \*

UNITED STATES PATENT AND TRADEMARK OFFICE
CERTIFICATE OF CORRECTION

PATENT NO. : 10,051,410 B2
APPLICATION NO. : 14/917787
DATED : August 14, 2018
INVENTOR(S) : Booth et al.

Page 1 of 1

It is certified that error appears in the above-identified patent and that said Letters Patent is hereby corrected as shown below:

In the Claims

In Column 20, Line 35, in Claim 13, delete "that that" and insert --that-- therefor In Column 20, Line 58, in Claim 16, delete "interface;" and insert --interface,-- therefor In Column 20, Line 65, in Claim 16, delete "person;" and insert --person,-- therefor Signed and Sealed this
Twenty-eighth Day of May, 2019

Andrei Iancu
*Director of the United States Patent and Trademark Office*